United States Patent
West

(10) Patent No.: US 7,311,538 B2
(45) Date of Patent: Dec. 25, 2007

(54) TAP-OFF INTERLOCK

(75) Inventor: Rodney J. West, Liberty, IN (US)

(73) Assignee: Square D Company, Palatine, FL (US)

( * ) Notice: Subject to any disclaimer, the term of this patent is extended or adjusted under 35 U.S.C. 154(b) by 103 days.

(21) Appl. No.: 11/227,940

(22) Filed: Sep. 16, 2005

(65) Prior Publication Data

US 2007/0066110 A1    Mar. 22, 2007

(51) Int. Cl.
*H01H 9/20* (2006.01)
(52) U.S. Cl. .................. 439/211; 200/50.2; 439/372
(58) Field of Classification Search ........ 439/207–214, 439/372; 200/50.2; 361/675
See application file for complete search history.

(56) References Cited

U.S. PATENT DOCUMENTS

| 2,984,769 | A | * | 5/1961 | Turton ..................... 361/675 |
| 3,048,672 | A | * | 8/1962 | Cataldo et al. ............ 200/50.2 |
| 3,657,606 | A | * | 4/1972 | Greger et al. ............... 361/675 |
| 4,308,437 | A | * | 12/1981 | Takagi et al. ............ 200/50.12 |
| 4,728,757 | A | * | 3/1988 | Buxton et al. ........... 200/50.21 |
| 4,831,489 | A | * | 5/1989 | Ozu et al. ................... 361/608 |
| 4,912,599 | A | * | 3/1990 | Wittmer ..................... 361/675 |
| 5,019,676 | A | * | 5/1991 | Heckenkamp ........... 200/50.18 |

* cited by examiner

Primary Examiner—Neil Abrams

(57) ABSTRACT

A bus to tap-off device interlock having a first position wherein the tap-off device can be installed or removed from the busway section and a second position in which an installed tap-off device can not be removed from the busway section and an uninstalled tap-off device can not be installed onto a busway section. The interlock is movable between the first and second positions by operation of an operating handle that controls the OFF or OPEN and ON or CLOSED state of an electrical disconnect device located inside the tap-off device.

22 Claims, 6 Drawing Sheets

TAP-OFF INTERLOCK

STATEMENT REGARDING FEDERALLY SPONSORED RESEARCH OR DEVELOPMENT

Not applicable

CROSS-REFERENCE TO RELATED PATENTS

Not applicable

FIELD OF THE INVENTION

The present invention relates to tap-off devices for busway electrical distribution system, and particularly to a bus to tap-off interlock.

BACKGROUND OF THE INVENTION

Electrical codes require that busway tap-off devices be provided with an interlock which prevents installation or removal of the tap-off device from the busway electrical distribution system when the electrical disconnect device (switch or circuit breaker) within the tap-off device is in a CLOSED or ON condition. Typical bus to tap-off device interlocks of the prior art, such as illustrated in U.S. Pat. Nos. 3,339,038; 3,657,606 and 4,912,599, require a number of sliding members, linkage components and associated hardware that must be installed on the tap-off device enclosure. These extra interlock components and the time required to install them on the tap-off device enclosure add cost to the tap-off device. The interlock devices of the prior art can also require an extra step during installation and removal of the tap-off device.

BRIEF DESCRIPTION OF THE DRAWINGS

The features of the invention will be more clearly understood from the following detailed description of the invention read together with the drawings in which.

Figure 1:
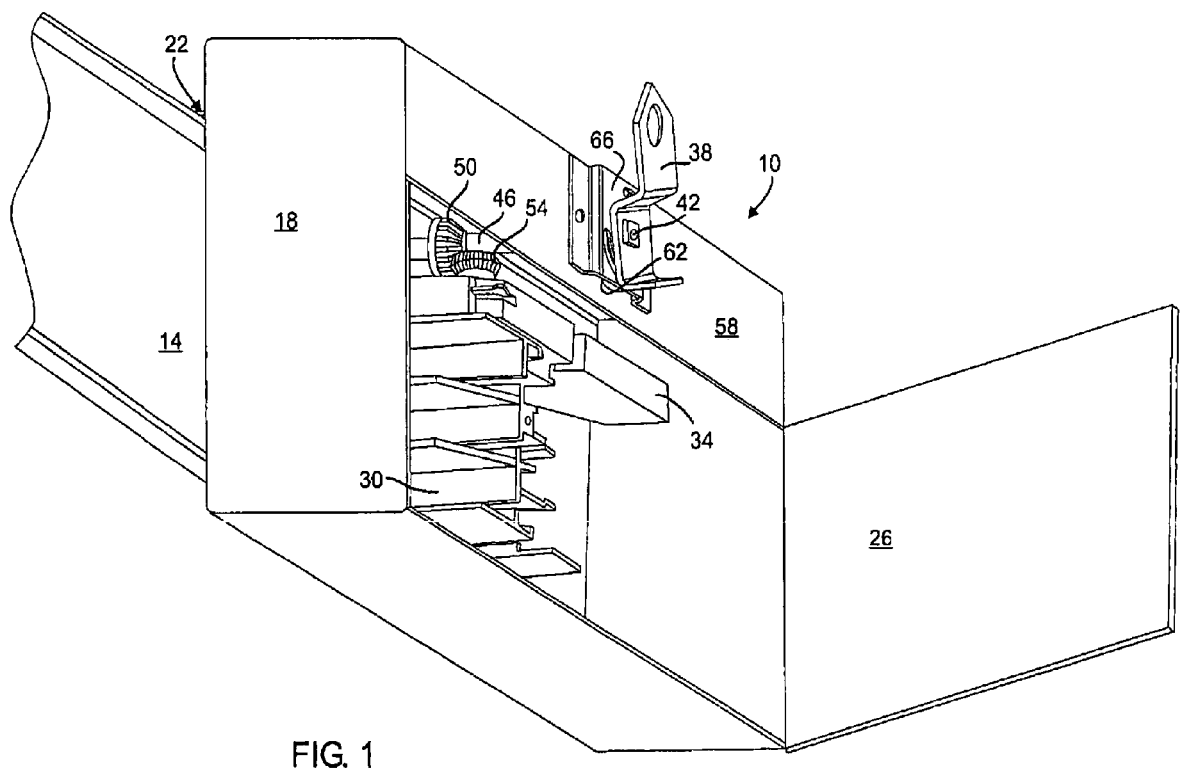
FIG. 1 illustrates a front interior view of a tap-off device constructed in accordance with the present invention.

Before one embodiment of the invention is explained in detail, it is to be understood that the invention is not limited in its application to the details of construction described herein or as illustrated in the drawings. The invention is capable of other embodiments and of being practiced or being carried out in various other ways. Further, it is to be understood that the phraseology and terminology used herein is for the purpose of description and should not be regarded as limiting.

DETAILED DESCRIPTION OF THE DRAWINGS

FIG. 1 illustrates a front interior view of a busway tap-off device 10, of the present invention installed on a busway section 14, of a busway electrical distribution system comprised of multiple busway sections 14, as is well known in the art. The tap-off device 10, includes an enclosure 18, which is provided with attaching means 22, such as hooks, clamps, etc. and various combinations thereof for mechanically attaching the tap-off device 10 to the busway section 14, a door 26 providing access to an electrical disconnect device 30, such as a switch or a circuit breaker, and an operating mechanism 34 for operating the electrical disconnect device 30. The electrical disconnect device 30 is movable between an OPEN or OFF position and a CLOSED or ON position by the operating mechanism 34 in response to movement of an operating handle 38 between an OFF and an ON position. The operating handle 38 is attached to a first end 42 of an operating shaft 46, which is mechanically connected to the operating mechanism 34 by a first gear 50 attached to the operating shaft 46 and a second gear 54 attached to the operating mechanism 34. The first end 42 of operating shaft 46 extends through a front surface 58 of the enclosure 18 and is supported by a bushing 62 retained by a bracket 66 attached to the front surface 58 of the enclosure 18. The bushing 62 and bracket 66 are shown in more detail in FIG. 5.

Figure 2:
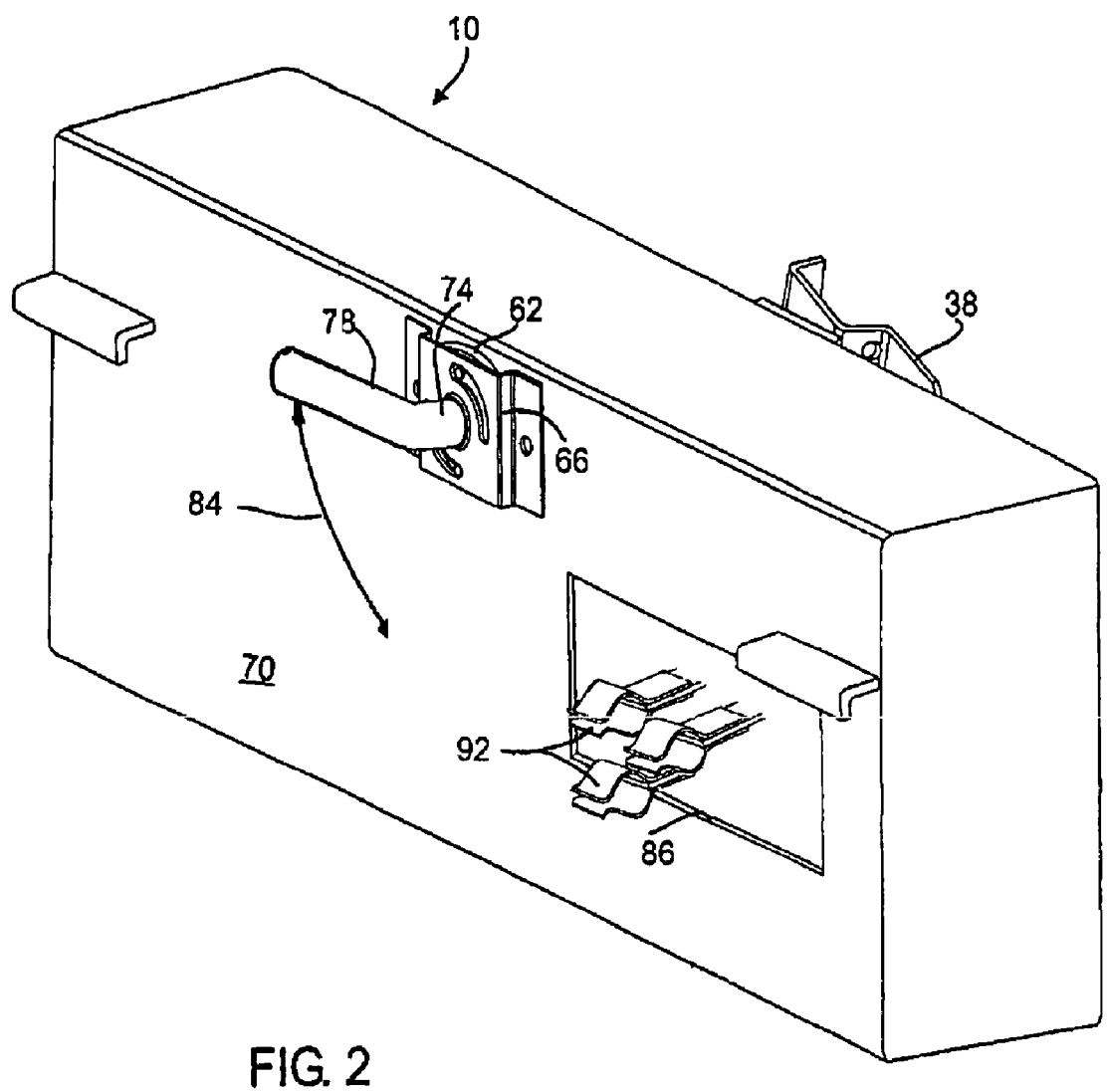
FIG. 2 illustrates a rear view of the tap-off device of FIG. 1 with a tap-off interlock.
Figure 3:
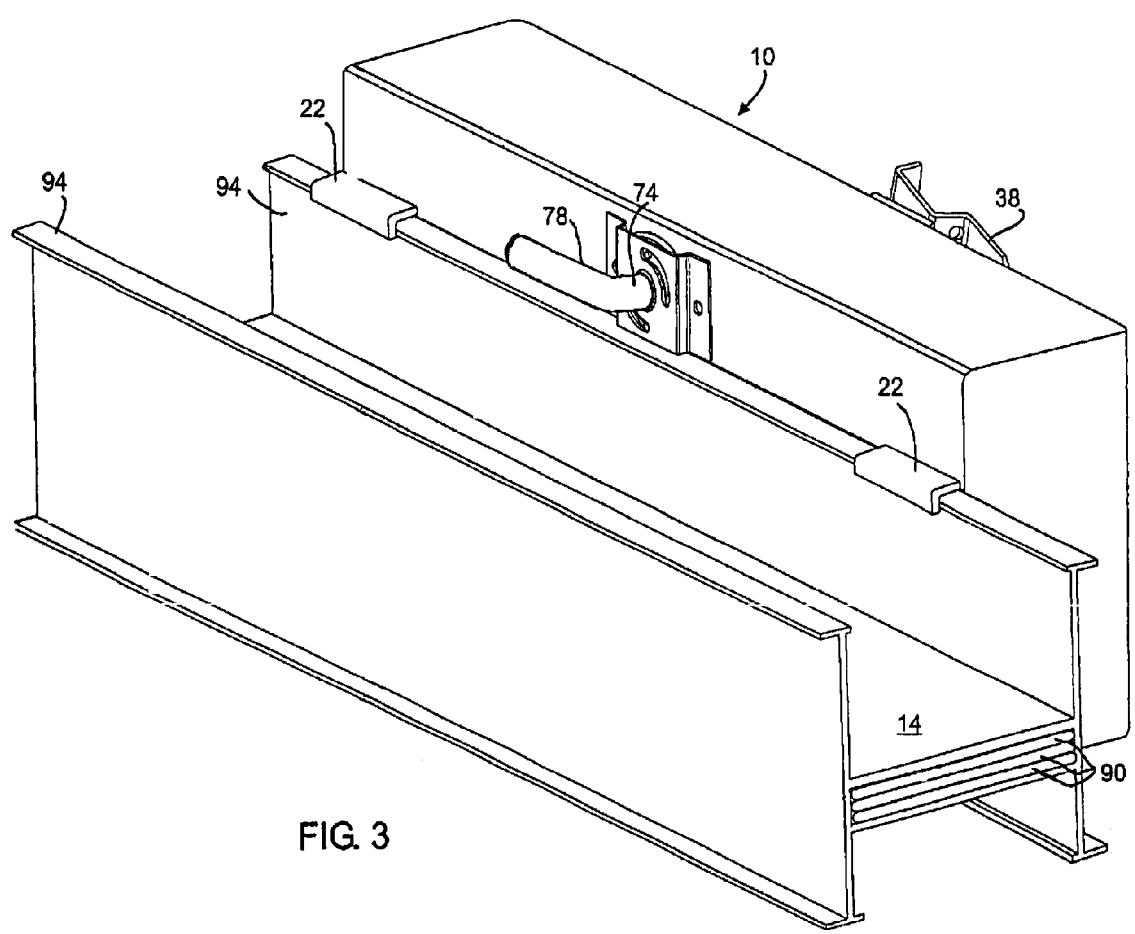
FIG. 3 illustrates a rear view of the tap-off device of FIG. 1 installed on a section of busway, the disconnect device of the tap-off device being in the OPEN or OFF position.
Figure 4:
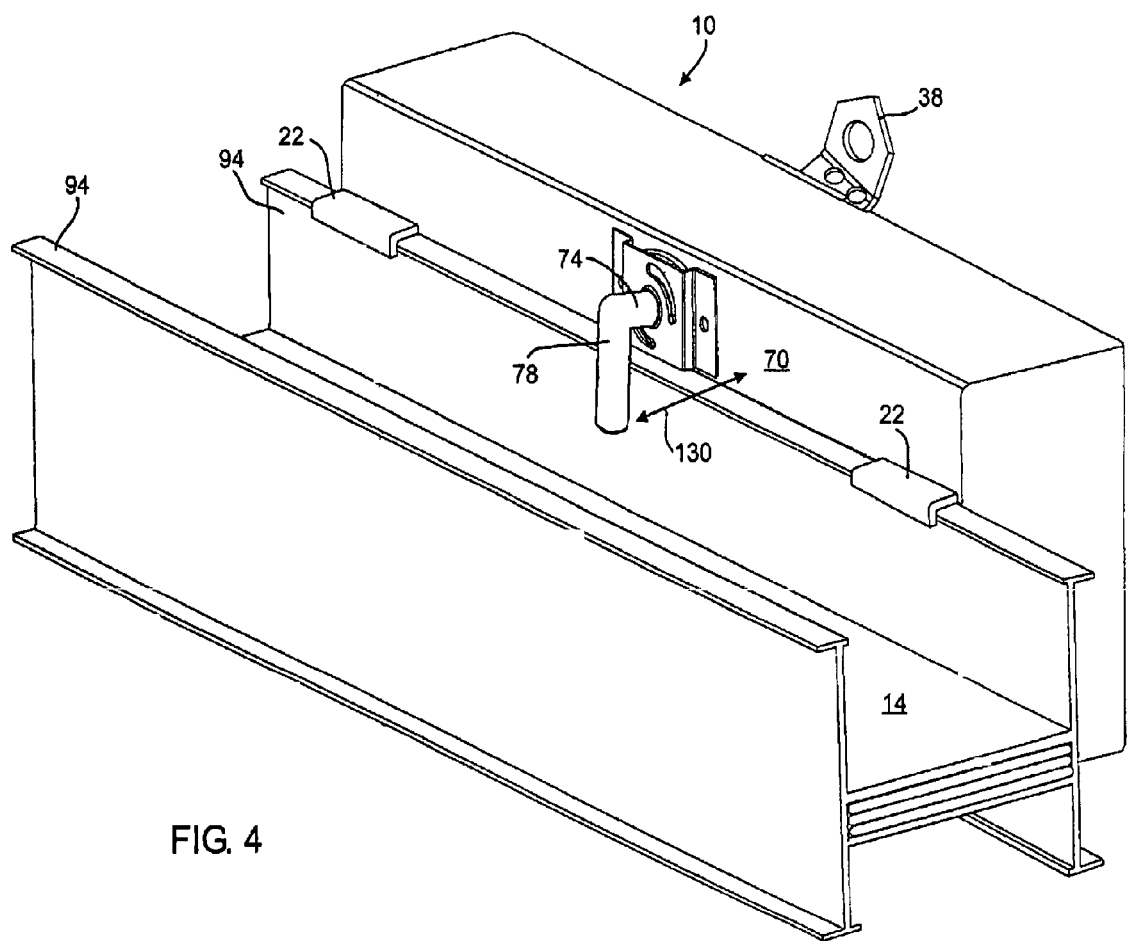
FIG. 4 illustrates in a rear view of the tap-off device of FIG. 1 installed on a section of busway, the disconnect device of the tap-off device being in the CLOSED or ON position.
Figure 5:
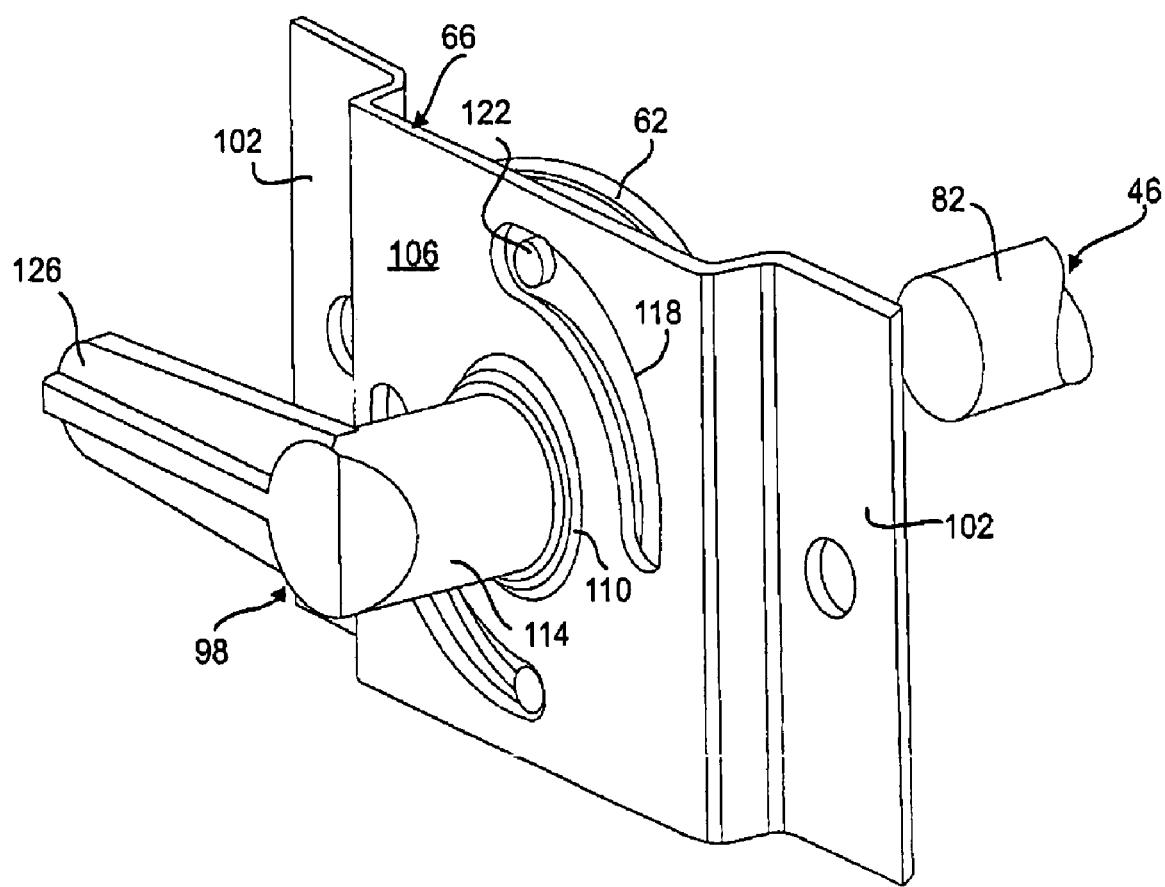
FIG. 5 illustrates a second embodiment of the tap-off interlock and a bushing and bracket constructed in accordance with the present invention.

FIG. 2 illustrates a rear view of the tap-off device 10. Located on a back surface 70 of the enclosure 18, directly opposite the operating handle 38, is a tap-off interlock 74, which prevents installation of the tap-off device 10 on to the busway section 14 or removal of the tap-off device 10 from the busway section 14 while the electrical disconnect device 30 is in the CLOSED or ON position. The tap-off interlock 74 is generally L-shaped with a leg 78 extending generally perpendicular to the axis of the operating shaft 46. The leg 78 can be integrally formed from a second end 82 of the operating shaft 46 as shown in FIGS 2–4 or can be a separate piece attached to the second end 82 of the operating shaft 46 as shown in FIG. 5. The direction at which the leg 78 extends from the operating shaft 46 is indexed with the operating handle 38 for common rotational movement therewith (as indicated by arrow 84) between a first position in which the leg 78 is associated with the OFF position of the operating handle 38 (FIGS. 2 and 3) and a second position in which the leg 78 is associated with the ON position of the operating handle 38 (FIG. 4). The second end 82 of operating shaft 46 extends through the back surface 70 of enclosure 18 and is supported by a second bushing 62 retained by a second bracket 66 attached to the back surface 70 of the enclosure 18. An aperture 86 is provided in the back surface 70 of enclosure 18 for making electrical connections between the electrical conductors 90 (FIG. 3) of the busway section 14 and the electrical disconnect device 30 by well known electrical connecting means, such as plug-on or bolt-on jaws 92, as disclosed in any of the previously cited patients.

FIG. 3. illustrates the first position of the leg 78 of tap-off interlock 74, with respect to a side rail 94 of the busway section 14 when the operating handle 38 and electrical disconnect device 30 are in the OPEN or OFF position. In this position the leg 78 of tap-off interlock 74 does not interfere with the side rail 94 and the tap-off device 10 can be installed onto or removed form the busway section 14 by pivoting about the attaching means 22.

Figure 6:
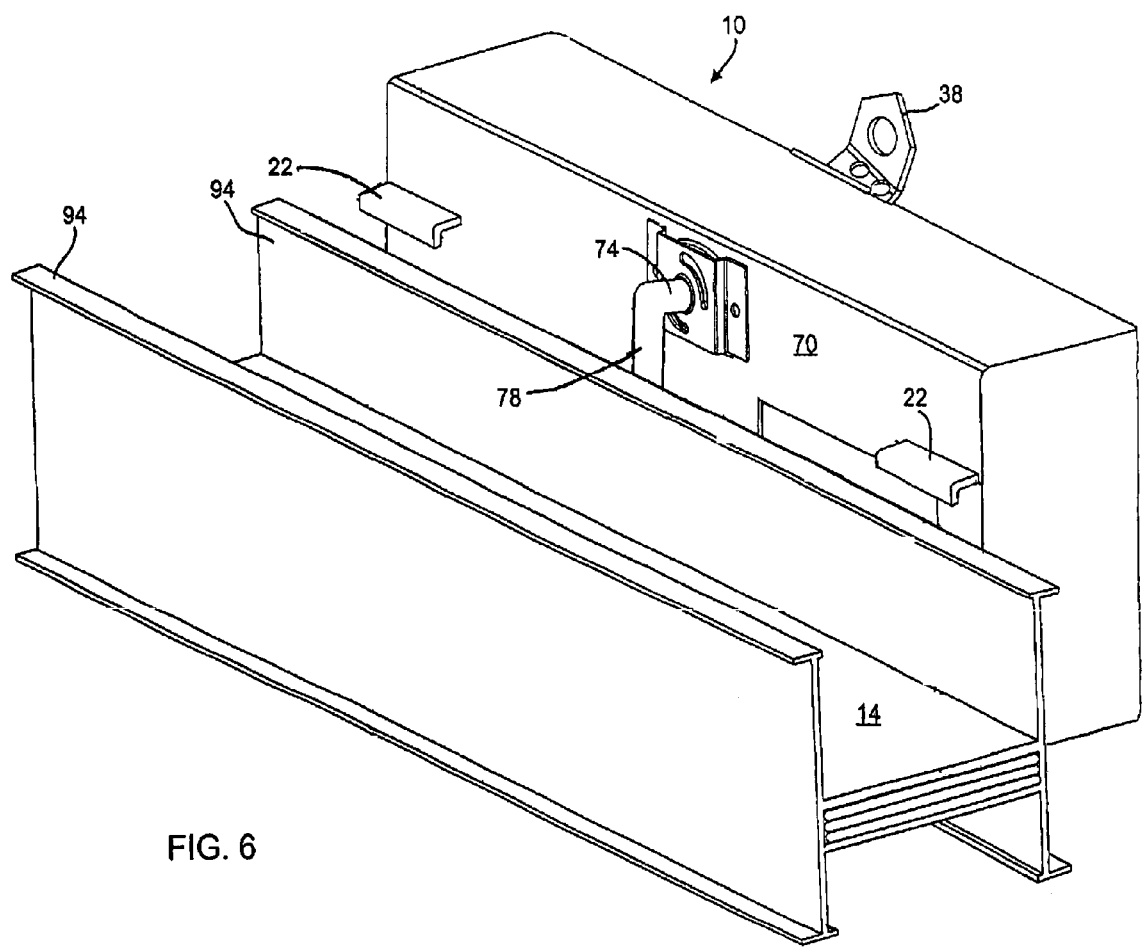
FIG. 6 illustrates how the interlock of FIGS. 2–5 prevents installation of the tap-off unit when the disconnect device is in the CLOSED or ON position.

FIG. 4. Illustrates the second position of the leg 78 of tap-off interlock 74, with respect to a side rail 94 of the busway section 14 when tap-off device 10 is installed on the busway section 14 and the operating handle 38 and electrical disconnect device 30 are in the CLOSED or ON position. In this position the leg 78 of tap-off interlock 74 is positioned immediately behind the side rail 94 of the busway section 14, such that interference between the leg 78 and side rail 94 prevents sufficient pivotal movement of the tap-off device 10 about the attaching means 22 to disengage the jaws 92 from the bus bars 90 and thereby prohibits the removal of the tap-off device 10 from the busway section 14. When the operating handle 38 and electrical disconnect device 30 of an uninstalled tap-off device 10 are in the CLOSED or ON position the leg 78 of tap-off interlock 74 will be positioned as shown in FIG. 6 between the side rail 94 of the busway section 14 and the back surface 70 of the tap-off device 10, preventing attaching means 22 of the tap-off device 10 from engaging the side rail 94 such that the tap-off device 10 can be pivoted about the attaching means 22 and thereby prohibits the installation of the tap-off device 10 onto the busway section 14.

FIG. 5 illustrates in more detail the bushing 62, bracket 66 and a tap-off interlock 98 attachable to the second end 82 of the operating shaft 46. The bracket 66 includes attaching surfaces 102 and a retaining surface 106 intermediate the attaching surfaces 102. The retaining surface 106 defines an aperture 110 through which either the first or second ends, 42 and 82 respectively, of the operating shaft 46 or a first leg 114 of the tap-off interlock 98 pass and at least one arcuate alignment slot 118. The bushing 62 is generally disk-like in shape and includes at least one alignment element 122 extending outwardly from a surface of the bushing 62 and being received in the alignment slot 118 of the bracket 66. The tap-off interlock 98 is generally L-shaped and constructed such that the first leg 114 can be attached to the second end 82 of operating shaft 46 in a manner that permits a second leg 126 to be indexed with the operating handle 38 for common movement therewith. The tap-off interlock 98 operates in the same manner as described above with respect to FIGS. 3 and 4. The tap-off interlock 98 can be constructed in one or two pieces by any suitable means including casting, forging, forming, molding or bending.

Although a rotational operation of the operating shaft 46 and interlock 98 has been disclose, it is within the scope of the invention that a back and forth linear operation of these elements will produce the intended function of the invention. In a linear operation of these elements it is understood that the orientation of the leg 78 will be as shown in FIG. 4, and that it will not rotate about the axis of the operating shaft 46, but will move in a linear direction, as indicated by arrow 130 in FIG. 4, with respect to the back surface 70 of the enclosure 18. In a first position of the operating handle 38, corresponding to the disconnect device 30 being in the OPEN or OFF position, the leg 78 is positioned a sufficient distance away from the back surface 70 to prevent interference with the side rail 94 as the tap-off device 10 is pivotally rotated about the attaching means 22 during installation or removal of the tap-off device 10 from the busway section 14. In a second position of the operating handle 38, corresponding to the disconnect device 30 being in the CLOSED or ON position, the leg 78 is positioned sufficiently close to the back surface 70 to ensure interference with the side rail 94 during an attempt to pivotally rotate the tap-off device 10 about the attaching means 22, thereby prohibiting the installation or removal of the tap-off device 10 from the busway section 14. In this embodiment the operating handle 38 may not be shaped as shown in the Figures and can incorporate a lever to translate pivotal movement between first and second positions of the operating handle 38 into linear movement of the operating shaft 46 and leg 78.

I claim:

1. A busway tap-off device interlock comprising:
   an enclosure for enclosing an electrical disconnect device;
   means for attaching the enclosure to a busway section of a busway electrical distribution system;
   an operating handle being attached to the enclosure for movement between an first position and a second position;
   an operating shaft having a first end attached to the operating handle for common movement therewith, a second end and means for operational communication with the electrical disconnect device such that movement of the operating handle between the first and second positions causes the electrical disconnect device to be moved between an OPEN or OFF position and a CLOSED or ON position;
   an interlock located at the second end of the operating shaft and configured for movement therewith, the interlock permitting the busway tap-off device to be installed on to the busway section or removal from the busway section when the electrical disconnect device is in the OPEN position and prohibiting the busway tap-off device from being installed on to the busway section or removed from the busway section when the electrical disconnect device is in the CLOSED position.

2. The busway tap-off device interlock of claim 1, wherein the interlock is formed from the second end of the operating shaft.

3. The busway tap-off device interlock of claim 1, wherein the interlock is a separate piece attached to the second end of the operating shaft.

4. The busway tap-off device interlock of claim 1, wherein the interlock rotates about the operating shaft axis.

5. The busway tap-off device interlock of claim 1, wherein the interlock moves linearly with respect to the operating shaft axis.

6. The busway tap-off device interlock of claim 1, wherein the interlock defines a leg extending generally perpendicularly to an axis of the operating shaft and being indexed with respect to the operating handle for movement between a first position corresponding to the electrical disconnect device being in the OFF position and a second position corresponding to the electrical disconnect device being in the ON position.

7. The busway tap-off device interlock of claim 6, wherein the interlock leg is not positioned to interfere with the busway section when the operating handle and the electrical disconnect device are in the OFF position, thereby permitting the installation of the tap-off device on to the busway section or the removal of the tap-off device from the busway section.

8. The busway tap-off device interlock of claim 6, wherein the interlock leg is positioned to interfere with a portion of the busway section when the operating handle and the electrical disconnect device are in the ON position, thereby preventing an attempt to install the busway tap-off device on to the busway section or remove the busway tap-off device from the busway section.

9. The busway tap-off device interlock of claim 1, wherein the first end of the operating shaft extends through a front surface of the enclosure.

10. The busway tap-off device interlock of claim 1, wherein the second end of the operating shaft extends through a back surface of the enclosure.

11. The busway tap-off device interlock of claim 1, wherein the means for operational communication between the operating shaft and the electrical disconnect device is a mechanical operator.

12. The busway tap-off device interlock of claim 11, wherein the mechanical operator is gear set.

13. A busway tap-off device interlock comprising:
   an enclosure for enclosing an electrical disconnect device;
   means for attaching the enclosure to a busway section of a busway electrical distribution system such that the electrical disconnect device is in electrical communication with electrical conductors of the busway electrical distribution system;
   an operating handle rotatively attached to a front surface of the enclosure for movement between an OFF position and an ON position;
   an operating shaft attached to the operating handle for common movement therewith, the operating shaft being in operational communication with the electrical disconnect device such that movement of the operating handle between the OFF and ON positions causes the electrical disconnect device to be moved between an OPEN or OFF position and a CLOSED or ON position, the operating shaft have a distal end extending through a back surface of the enclosure, and;
   an interlock attached to the distal end of the operating shaft for common movement therewith, the interlock permitting the busway tap-off device to be installed on to the busway section or removal from the busway section when the electrical disconnect device is in the OPEN position and prohibiting the busway tap-off device from being installed on the busway section or removed from the busway section when the electrical disconnect device is in the CLOSED position.

14. The busway tap-off device interlock of claim 13, wherein the interlock defines a leg extending generally perpendicularly to a rotational axis of the operating shaft and being indexed with respect to the operating handle.

15. The busway tap-off device interlock of claim 13, wherein the interlock leg is positioned to interfere with a portion of the busway section when the operating handle and the electrical disconnect device are in the ON position thereby preventing an attempt to install the busway tap-off device on to the busway section or remove the busway tap-off device from the busway section.

16. The busway tap-off device interlock of claim 13, wherein the interlock leg is not positioned to interfere with the busway section when the operating handle and the electrical disconnect device are in the OFF position thereby permitting installation of the busway tap-off device on to the busway section or removal of the busway tap-off device from the busway section.

17. The busway tap-off device interlock of claim 13, wherein operational communication between the operating shaft and the electrical disconnect device is accomplished by a gear set.

18. A tap-off interlock comprising:
   an enclosure configured for being attached to a section of a busway electrical distribution system, the enclosure containing an electrical disconnect device for taping-off electric power from the busway electrical distribution system, and;
   an operating shaft passing through the enclosure, the operating shaft having a first end being operatively connected to an operating handle, a second end forming an interlock and means for engaging and operating the electrical disconnect device between an OFF or OPEN position and an ON or CLOSED position in response to movement of the operating handle between a first position and a second position;
   wherein the interlock prevents the enclosure from being installed onto the busway section or removed from the busway section when the operating handle is in a particular one of the first and second positions.

19. The tap-off interlock of claim 18 wherein the particular one of the first and second positions of the operating handle corresponds to the electrical disconnect device being in the ON or Closed position.

20. The tap-off interlock of claim 18 wherein the interlock defines a leg extending generally perpendicularly to an axis of the operating shaft and being indexed with the operating handle.

21. The tap-off interlock of claim 20 wherein the interlock leg is positioned by the operating handle to interfere with a portion of the busway section during an attempt to install or remove of the enclosure from the busway section when the electrical disconnect device is in the ON or Closed position.

22. The tap-off interlock of claim 20 wherein the interlock leg is positioned by the operating handle such that it does not interfere with the busway section during an attempt to install or remove of the enclosure from the busway section when the electrical disconnect device is in the OFF or OPEN position.

* * * * *